Oct. 24, 1967     W. E. LACKENBAUER ETAL     3,348,471
CHARCOAL BROILER

Filed June 16, 1966     2 Sheets-Sheet 2

INVENTORS
THOMAS G. BROWN
WILLIAM E. LACKENBAUER

BY Sherman & Shalloway
ATTORNEYS 3,348,471
CHARCOAL BROILER
William E. Lackenbauer, 148 Pineview Road, Dudley, Mass. 01570, and Thomas G. Brown, Rte. 44, East Putnam, Conn. 06260
Filed June 16, 1966, Ser. No. 558,086
1 Claim. (Cl. 99—421)

ABSTRACT OF THE DISCLOSURE

A charcoal broiler having a vertically aligned heating element arranged in the rear wall thereof adapted to be completely enclosed during cooking and further adapted to be easily removed and cleaned and also providing an effective means for segregating ashes from charcoal during cooking.

---

This invention relates generally to stoves, and relates more specifically to a charcoal broiler which employs an oven-type, compact construction.

Charcoal broilers are known in the prior art and have assumed many different shapes. Oven-type charcoal broilers have also been used previously. However, the charcoal broilers used previously have suffered from various disadvantages. Among these disadvantages are (a) cleaning of the stove involves dirty and ineffective methods, (b) the broiler, while in use, presents a hazard, due to the heat generated, to one cooking therewith and to others, especially children, in the vicinity, (c) sparks from the broiler were found to escape, presenting a danger of fire, (d) the driving means for an automatically driven spit is bulky and care must be taken in assembling the driving means and broiler before each use so that the spit and the motive element are aligned in a firmly attached relationship, (e) the ashes produced in burning charcoal are allowed to accumulate, thus reducing the efficiency of the boiler and also allowing ashes to be deposited on the food being cooked, and (f) in the broilers wherein the heating element—charcoal—is placed horizontally below the food to be cooked, it has been found that the heating efficiency is less than desired and that an excess of fuel is often consumed.

The present invention provides a novel charcoal broiler which avoids the above-stated disadvantages by providing an oven-type broiler having a vertically aligned heating element arranged in the rear wall of the oven which is adapted to be completely enclosed during cooking, which is adapted to be easily removed and cleaned, and which provides an effective means for segregating ashes from charcoal during cooking. This novel broiler further provides an automatically operated spit which spit and its driving means are adapted to be adjusted to various distances from the heating element and to be securely and integrally fastened together and to the oven at each various position.

It is a primary object of the present invention to provide a stove of the charcoal broiler-type which is provided with a vertically disposed heating component along the rear wall thereof.

It is a further object of the invention to provide such a device wherein a skewer is adapted to be adjustably positioned with reference to the heating component so that varying rates of cooking may be attained.

Another object is to provide an oven of the above-described type which is easily cleansed, is safe to operate and is adapted to give efficient cooking results using a reduced quantity of fuel.

A further object is to provide an automatic oven wherein the motive element is securely fastened to the oven and is adapted to be easily movable to a plurality of secured positions.

Still another object of the invention is to provide a heating element in the described oven adapted to be fed from the top which is easily removed and easily cleaned, and which contains an ash separating section.

This invention will be more specifically described by reference to the construction thereof. A generally box-like structure is provided which serves as an oven and is placed upon a suitable frame, such as legs, removably secured thereto and which oven comprises a system of walls made of any suitable material, preferably a light weight metal such as aluminum. A base is provided with a removable tray which is adapted to contain any drippings from the food or material being cooked without burning them and thus subjecting the food to localized hot spots. Since drippings aren't allowed to contact the fire, the smoke produced in the oven is negligible. The base tray also serves as a safety measure in that any sparks from the fire are contained within the oven and not allowed to fall onto the ground or onto persons standing nearby. Also the double wall structure serves to contain more heat in the oven and to keep the bottom wall cooler and thus safer. A front wall is provided which is hinged and adapted to be folded upwardly for opening and closing the oven; it is apparent that any suitable folding or opening door may be provided but this invention preferably provides it as being positioned as a portion of the front wall. The front wall is further provided with a suitable temperature indicator preferably located in the portion comprising the folding door. Two side walls are provided. One side wall has a plurality of stations adapted to receive and securely hold during rotation a spit or skewer element. The other side wall is provided with a corresponding number of skewer stations aligned with those in the opposite side wall; this second side wall is also provided with an adjustable motor bracket which bracket is adapted to receive a suitable motor for driving the skewer element and to hold it securely aligned, in a plurality of positions, with both the skewer and the side wall. The type of motor bracket is, of course, dependent upon the type of motor used; however, according to the preferred form of this invention, a novel motor bracket is provided which, when used with a suitable motor, provides a securely fastened connection in each of a plurality of positions corresponding to the plurality of stations provided for the skewer element. A rear wall is provided in the oven and is provided with brackets adapted to hold a heating component. The heating component comprises a generally rectangular shaped component adapted to be inserted in the oven from the top and to be removably attached to the rear wall of the oven. The heating component serves to hold charcoal in a vertical alignment over approximately the entire area of the rear wall and is adapted to receive charcoal from the top thereof. The heating component structurally comprises a rectangular rear wall adapted to be held by brackets provided on the oven rear wall, two side walls each consisting of two parallel channels, and having lifting elements thereon, a bottom end wall and a front wall adjacent the bottom end wall and covering an area of less than one-fourth the area of the rear wall. The arrangement described—two parallel channels—for the side walls provides two slots between the adjacent channel side walls which slots receive an inner rear wall and an inner front wall of the heating component. These inner walls are removably secured in said slots and serve the following purposes: The inner rear wall is easily removable for cleaning purposes and additionally serves to contain a portion of the heat generated in the heating component so that the rear wall of the oven itself does not become overheated and thus present a hazard to bystanders; the inner front wall consists of a mesh-like or screen-like surface which is L-shaped and which contains the charcoal but allows the heat generated to be transmitted to the material being cooked and allows ashes to fall through onto the bottom end wall. This inner front wall forms the front wall of the heating component over at least three-fourths of the area of said wall, while the outer front wall arranged adjacent the bottom end wall of the heating component forms the front wall of the heating component over the remainder of the area. As is apparent, the front wall of the heating component is in part mesh-like and in part solid, the solid part being adjacent the bottom of the wall. The purpose of this enclosed portion of the heating component formed by the bottom end wall, the outer front wall, the rear wall and side walls, is to receive ashes from the charcoal and to contain them effectively. The top of the heating component is covered by a folding lid which forms a part of the top wall of the oven; this top lid is effective to completely contain the charcoal being burned, and to retain any sparks and ashes within the oven. When it is necessary to feed more charcoal to the heating component, the lid is opened and charcoal is dropped vertically into the component. Serving trays are also provided which are removably attached to the front and side walls of the oven. These trays may be of any suitable material but preferably are of wood with metal trimming and attaching brackets, to provide an attractive and durable tray. The legs of the frame may be of varying design such as a pair of cross-bars at each side of the oven or four upright legs. The legs, whatever the design, are removably attached to the oven by inserting them in receiving notches disposed at the four bottom corners of the oven. The legs are to be constructed of sturdy and durable material, as, for example, angle iron. A utility platform may be provided attached to the legs whereby cooking utensils and raw materials may be disposed safely out of the way; this tray may be made of any desired and suitable material.

Thus, it may be seen that the present invention provides a novel oven which avoids the disadvantages of the prior art. The oven of this invention is adapted to be used with safety and efficiency and is easily cleaned to provide a sanitary utensil. The heat produced from a reduced quantity of fuel may be directed and utilized more effectively by the present construction.

With the above and other objects and advantageous features in view, the invention consists of a novel arrangement of parts more fully disclosed in conjunction with the accompanying drawings wherein like numerals represent like elements, and in which FIGURE 1 represents an exploded perspective view of an illustrative charcoal broiler embodying the invention, the doors of the broiler being open.

Referring now to the drawings in detail, the elements of the oven and their operation will be described more fully. In the drawings, like numerals represent like elements.

Figure 1:
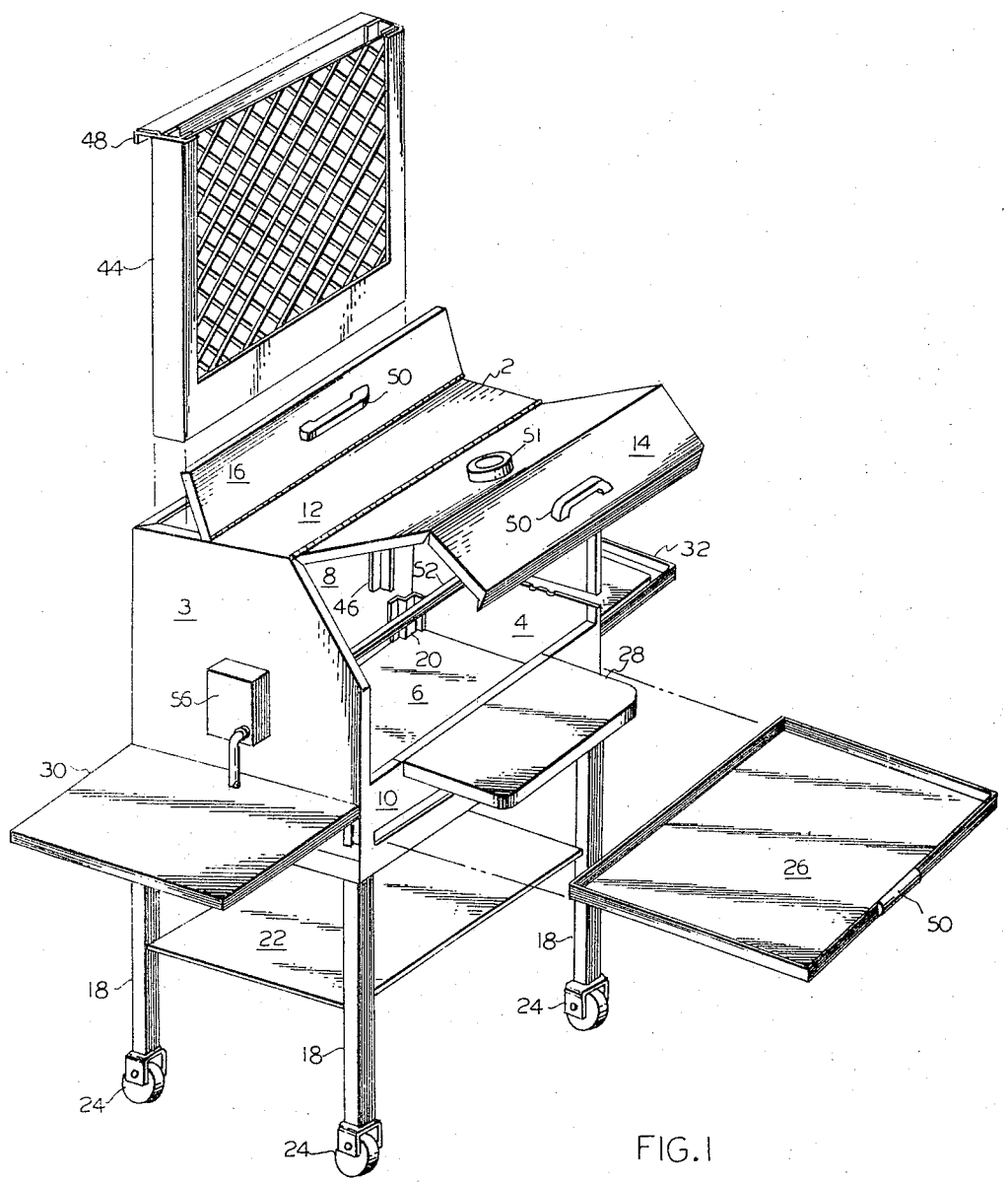
Figure 2:
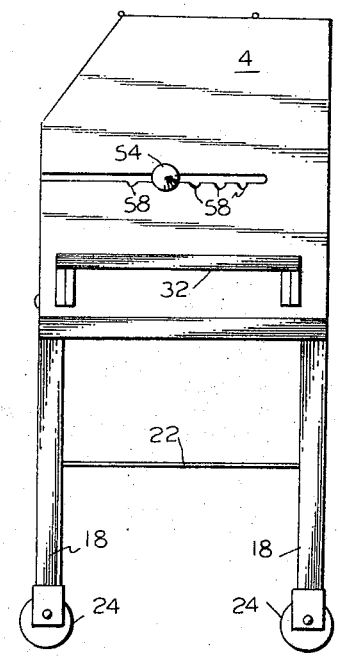
FIGURE 2 represents a side view of the charcoal broiler of FIGURE 1.

FIGURE 1 illustrates a charcoal broiler 2, incorporating the novel features of the present invention. Side walls 3 and 4 are provided attached to a bottom wall 6, a rear wall 8, a front wall 10, and a top wall 12. A foldable front door 14, forms part of the front wall of the oven and part of the top wall of the oven. An opening door 16 forms a part of top wall 12. Legs 18 are provided and act as a frame for the oven; these legs are attached by inserting the upper portion thereof into recesses in the oven base. One such recess is illustrated at 20 in FIGURE 1. The frame is provided with a tray 22 which is suitable for storage and general utility purposes. Legs 18 are provided with casters 24 which may be movable as shown in FIGURES 1 and 2 or may be of any desired construction and type. It should be understood that the frame illustrated in FIGURE 1 is only one suitable frame, it being possible to utilize any desired frame or supporting means for the oven.

As is shown in FIGURE 1, charcoal broiler 2 is further provided with a slidably removable drip pan 26 adapted to contain any drippings, or grease, from the material being cooked.

Removable trays 28, 30 and 32 are adapted to fit onto the oven walls. These trays may be of any suitable material as described hereinbefore, however, it is desired for both aesthetic and functional purposes to make the tray from a lightweight wood having a metal trimming such as an aluminum strip. These trays are useful in serving the prepared foods. The means for attaching these trays onto the oven walls are shown best in FIGURES 4 and 5.

Figure 4:
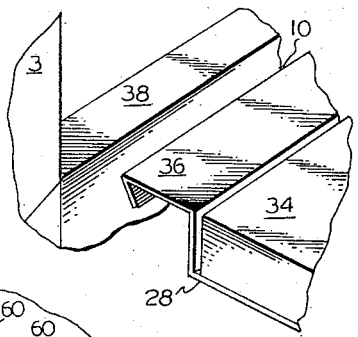
FIGURE 4 represents a sectional view showing the means for attaching the removable front tray.

In FIGURE 4, tray 28 has a wooden portion 34 and a metal bracket 36 attached by suitable means such as by screws, not shown. This bracket is adapted to engage the inturned edge 38 of the front wall 10 of the oven.

Figure 5:
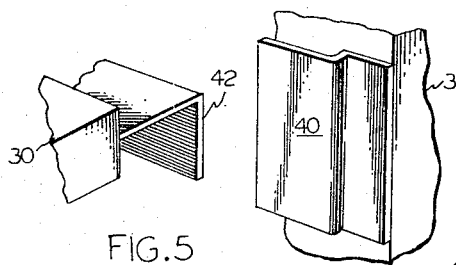
FIGURE 5 represents a sectional view showing the means for attaching the removable side trays.

FIGURE 5 represents the means for attaching side trays 30 and 32. Brackets 40 are attached to the oven walls 3 or 4 in a suitable manner such as by spot-welding. These brackets are adapted to engage flange 42 provided on the trays 30 and 32.

Referring again to FIGURE 1, the charcoal broiler is seen to be provided with a fire box generally indicated by numeral 44. The details of the fire box will be discussed below, however, it should be noted that the fire box is slidably inserted in the top of the oven and serves to supply heat while positioned vertically against rear wall 8. Bracket 46 are provided on the inside of rear wall 8 to maintain the fire box in alignment; the brackets are attached by suitable means such as by spot-welding to the wall. Any suitable bracket may be provided, however, the preferred bracket shown in FIGURE 1 merely provides a right-angle which receives the rear edge of the fire box and prevents movement in a lateral direction. To maintain the fire box in vertical alignment, a flange 48 is provided as an extension of the rear wall of the fire box and which is adapted to engage the upper end of rear wall 8.

The foldable doors provided are the front door 14 which opens to allow inspection or removal of the food and to allow easy access for cleaning the oven, and the top door 16 serves as a cover for the fire top to enable said fire box to be completely enclosed in the oven. Suitable handles of a non-heat conducting material 50 are provided. The front door is provided with a suitable heat indicator 51. It should be understood that the type and position of the temperature indicator are not critical. The location shown in FIGURE 1 has been found to give accurate indication without producing damage to the indicator by the intense heat generated adjacent the fire.

A spit 52 is provided and can be of any known type. The spit is inserted in one wall of the oven such that a non-heat conducting handle 54 extends out of the wall of insertion and a portion of the other end of the spit extends out of the opposite wall of the oven to engage motor 56. As seen in FIGURE 2, a number of spit positions 58 are provided to allow the spit to be adjusted at various distances from the heat and to thus achieve different cooking rates. The portion of the spit which engages the motor extends through openings 60 shown in FIGURE 6. The openings in the wall are aligned with the various spit positions 58, provided in the opposite wall.

Figure 6:
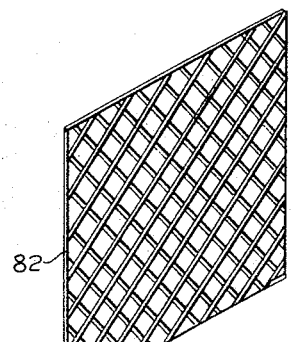
FIGURE 6 represents a sectional view showing the adjustable motor bracket of the present invention.

The motor 56 is of such construction that it may be positioned on motor bracket 62 shown in FIGURE 6 and in such position may engage the extension of the spit to rotate said spit. The novel motor bracket illustrated as 62 in FIGURE 6 allows a suitable motor to be positioned at a number of positions corresponding to the position of the spit. At each such position, the motor will be securely and integrally fastened to the oven while engaging the spit. The provision of an adjustable motor bracket avoids the bulky and dangerous means used in the prior art wherein a motor must be positioned in a stationary position and the adjustability, if any, is provided by means of auxiliary drive belts which can be adjusted to engage a spit. These devices are clearly bulky, cumbersome, and dangerous and such disadvantages are avoided by the present concept. The motor is of compact size and is provided in a casing with flanges thereon adapted to slide onto bracket 66 shown in FIGURE 6.

Figure 3:
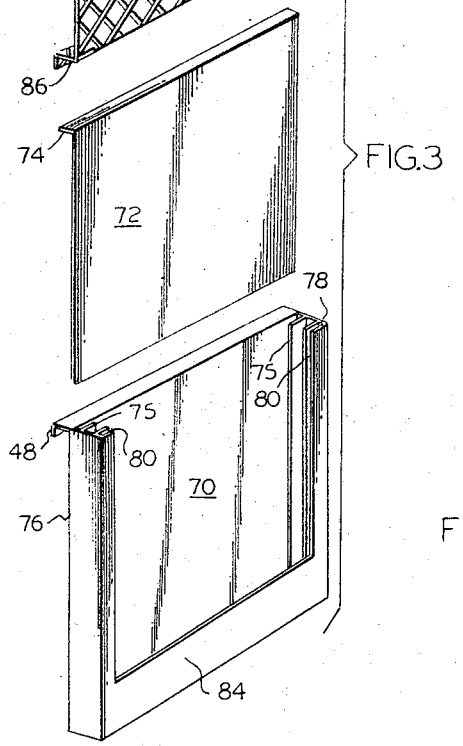
FIGURE 3 represents an exploded view of the fire box used in the charcoal broiler of FIGURES 1 and 2.

With reference to the details of the novel fire box the fire box or heating component 44, as above-described, is vertically aligned against the rear wall of the oven. Fuel, such as charcoal, may be fed into the fire box by lifting top element 16. As best seen in FIGURE 3, the fire box comprises a rear wall 70 with flange means 48 forming an extension thereof. An inner rear wall 72 is slidably inserted into channel 75 and is provided with a flange 74 which merely abuts rear wall 70. Side walls 76 and 78 are provided with two slots 75 and 80 each for engaging inner rear wall 72, and screen-like member 82. The fire box has an outer front wall 84 which, as shown, covers only a minor portion of the front area. The fire box also has a bottom wall, not seen, which is connected with outer rear wall 70, outer front wall 84, and side walls 76 and 78. The inner front wall consists of a mesh-like or screen-like member 82 which is slidably secured in slots or channels 80, provided on the side walls. The member 82 is provided with an L-shaped extension at its bottom which serves to define an ash-receiving chamber. Ashes are allowed to pass through the portion 86 which serves as an inner bottom wall; the ashes pass through element 86 and rest on the outer bottom wall, not seen. The element 82, when assembled, forms the front surface of the heating component. The screen-like nature allows heat to be radiated from the burning fuel to the substance being cooked, while the coals or fuel is restrained and held in vertical alignment, thus allowing for a more efficient and economical utilization of fuel. The mesh-size should be of a suitable size to retain the fuel while allowing heat to be radiated.

Although a specific constructional arrangement of the invention has been described, it is obvious that changes in the size, shape, and arrangement of the parts may be made without departing from the spirit and the scope of the invention, as defined in the appended claim.

We claim:

An oven-type charcoal broiler comprising a base supported on a removable frame, a foldable front wall, a rear wall, a heating component removably attached to said rear wall, and provided with an ash separation element, a first side wall having a plurality of stations therein adapted to receive a skewer, a second side wall having a corresponding number of stations therein adapted to receive a skewer and additionally having an adjustable bracket for a motor on the outside thereof, a folding lid for said heating component which forms a part of a top wall of said oven, said charcoal broiler further including a temperature indicator provided on said foldable front wall, removable serving trays attached to said front and side walls, a removable drip pan disposed between said skewer and said base, a tray removably secured to said frame, said heating component being adapted to receive fuel fed through the top of said component and being adapted to retain said fuel in vertical alignment across the rear wall of the oven, said heating component comprising a rear wall having a flange on the outside thereof for attaching said component to the oven, a first side wall and a second side wall each having slots for slideably receiving an inner rear wall and an L-shaped grate, which grate serves as an inner front wall over at least three-fourths of the area of the rear wall and as an inner bottom wall, a bottom wall, and a front wall adjacent said bottom wall which front wall covers an area less than one-fourth the area of the rear wall.

References Cited

UNITED STATES PATENTS

| | | | |
|---|---|---|---|
| 2,379,239 | 6/1945 | Krebs | 126—25 X |
| 2,512,223 | 6/1950 | Contiguglia | 126—25 X |
| 2,718,485 | 9/1955 | Dudley | 99—421 |
| 2,768,042 | 10/1956 | Persinger et al. | |
| 2,787,995 | 4/1957 | Alter | 126—25 |
| 2,923,229 | 2/1960 | Halford. | |
| 3,124,057 | 3/1964 | Kiser | 99—421 X |
| 3,175,549 | 3/1965 | Bergsten | 126—25 |

WALTER A. SCHEEL, *Primary Examiner.*

J. M. NEARY, *Assistant Examiner.*